United States Patent
Huang

(10) Patent No.: US 8,492,017 B2
(45) Date of Patent: Jul. 23, 2013

(54) BATTERY AND HOLDING STRUCTURE FOR SAME

(75) Inventor: Chih-Chien Huang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

(21) Appl. No.: 13/473,721

(22) Filed: May 17, 2012

(65) Prior Publication Data
US 2012/0225338 A1    Sep. 6, 2012

Related U.S. Application Data

(62) Division of application No. 12/610,484, filed on Nov. 2, 2009.

(30) Foreign Application Priority Data

Feb. 27, 2009   (CN) .......................... 2009 1 0300605

(51) Int. Cl.
*H01M 2/10*       (2006.01)
*H04B 1/38*       (2006.01)
*H05K 5/00*       (2006.01)

(52) U.S. Cl.
USPC ............ 429/96; 429/156; 429/163; 455/90.3; 455/347; 455/575.1; 361/679.01

(58) Field of Classification Search
None
See application file for complete search history.

(56) References Cited

U.S. PATENT DOCUMENTS

D304,026 S  *  10/1989  Goodner et al. ............. D13/103
2008/0050648 A1*   2/2008  Hara et al. .................... 429/160

FOREIGN PATENT DOCUMENTS

CN        1227981 A       9/1999

* cited by examiner

*Primary Examiner* — Cynthia Walls
(74) *Attorney, Agent, or Firm* — Altis Law Group, Inc.

(57) ABSTRACT

A battery for a portable electronic device includes a recess, a number of electronic strips arranged on the bottom surface of the recess, and a number of latching slots defined in the sidewall of the recess.

7 Claims, 3 Drawing Sheets

BATTERY AND HOLDING STRUCTURE FOR SAME

CROSS-REFERENCE TO RELATED APPLICATION

This application is a divisional application of U.S. Ser. No. 12/610,484, filed on Nov. 2, 2009.

BACKGROUND

1. Technical Field

The present disclosure relates to batteries and holding structures, particularly to a battery and a holding structure for holding the battery.

2. Description of Related Art

Portable electronic devices such as mobile phones and personal digital assistants (PDAs) are widely used. A battery having conductive connectors formed is generally installed in a receiving cavity of the portable electronic device. The conductive connector contact corresponding metallic elastic pins exposed inside the receiving cavity. Accordingly, the battery electrically connects the integrated circuit of the electronic device and provides electric energy for the electronic device. The battery is covered and secured by a cover.

A space between the battery and the sidewall of the receiving cavity is required for assembly of the battery in the portable electronic device. However, the battery may move within the receiving cavity due to the space. Due to the movement of the battery, the electrical connection of the elastic pins and the conductive connector may be broken.

Therefore, there is room for improvement within the art.

BRIEF DESCRIPTION OF THE DRAWINGS

Many aspects of the present battery and holding structure for same can be better understood with reference to the following drawings. The components in the various drawings are not necessarily drawn to scale, the emphasis instead being placed upon clearly illustrating the principles of the present battery and holding structure for same. Moreover, in the drawings, like reference numerals designate corresponding parts throughout the diagrams.

DETAILED DESCRIPTION

Figure 1:
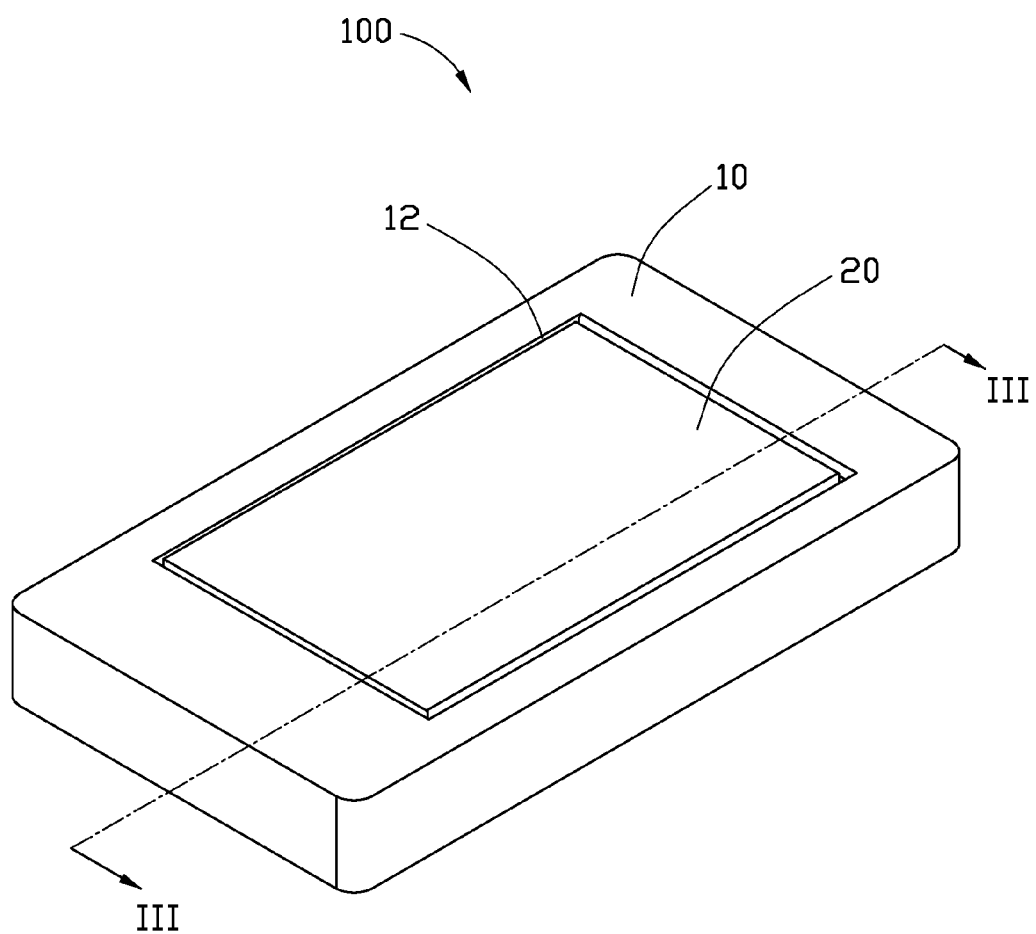
FIG. 1 is an assembled schematic view of a holding structure, according to an exemplary embodiment.
Figure 2:
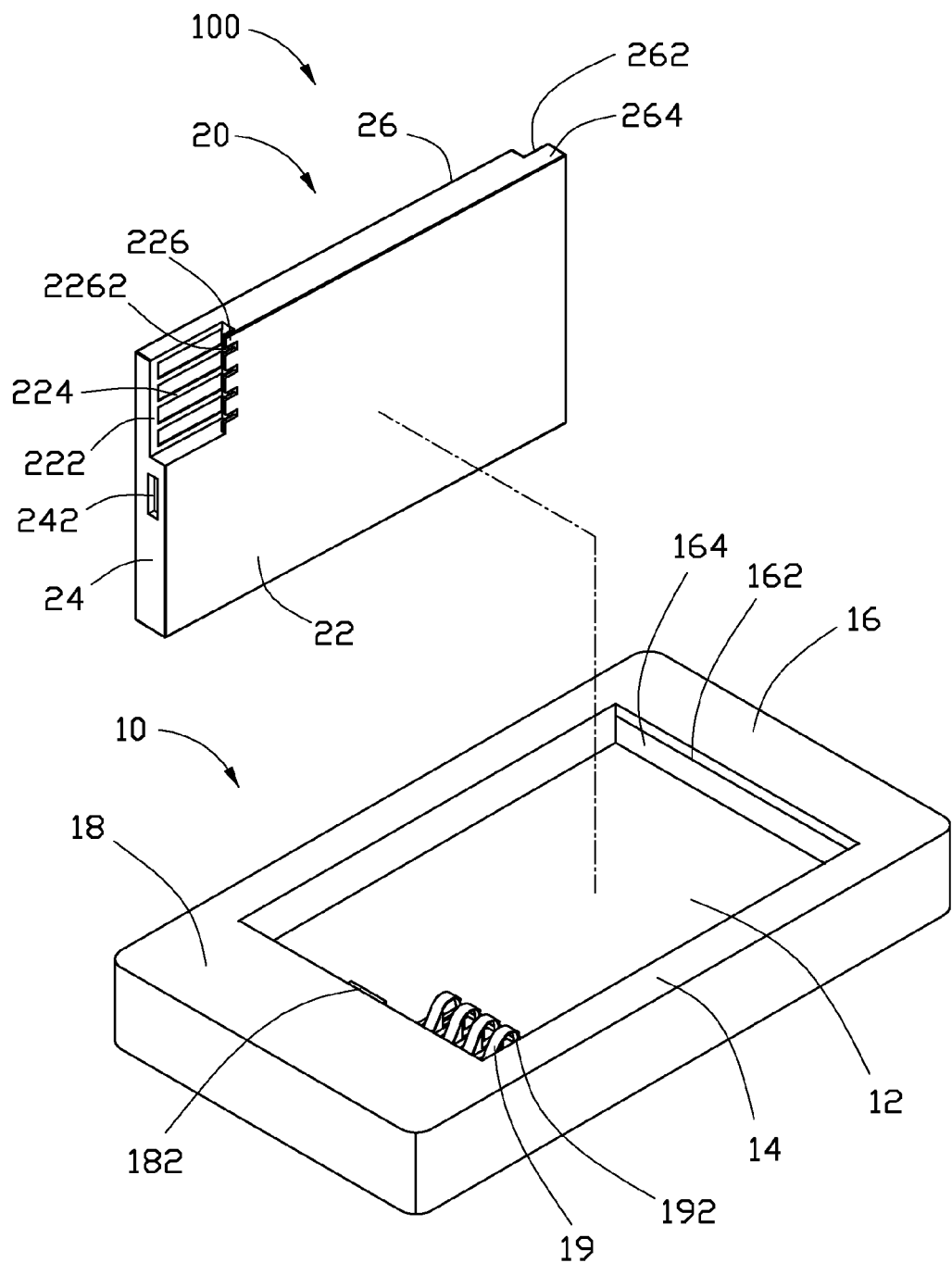
FIG. 2 is a disassembled schematic view of the holding structure shown in FIG. 1.

FIGS. 1 and 2 show an exemplary holding structure 100 for mobile phones, and other portable electronic devices, such as personal digital assistants (PDAs), digital cameras, etc. The holding structure 100 includes a housing 10 and a battery 20 detachably received in the housing 10.

Figure 3:
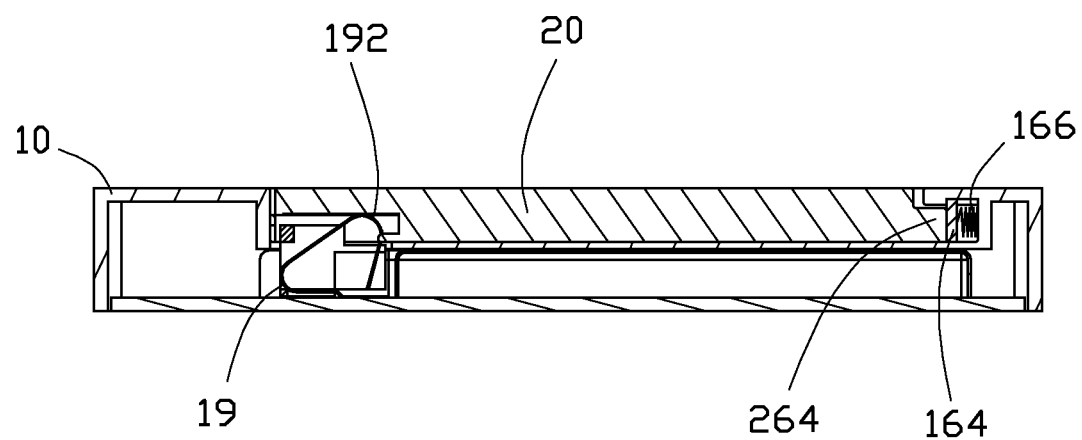
FIG. 3 is a sectional schematic view along the line shown in FIG. 3.

The housing 10 defines a receiving cavity 12 to receive the battery 20. The receiving cavity 12 is enclosed by two sidewalls 14, a first end wall 16, and a second end wall 18. The first end wall 16 defines a locking groove 162 communicating the receiving cavity 12. The locking groove 162 is for latching with an end portion of the battery 20. The locking groove 162 has a stopping board 164 and an elastic member 166 (shown in FIG. 3) therein. The elastic member 166 is resisted and deformed between the bottom of the locking groove 162 and the stopping board 164. The stopping board 164 can be moved within the locking groove 162 under the deformation of the elastic member 166. The second end wall 18 has a protrusion 182 protruding therefrom and located inside the receiving cavity 12. The protrusion 182 is engageable with the battery 20. A plurality of metallic elastic pins 19 are arrayed in parallel on the bottom and in a corner of the receiving cavity 12. Each elastic pin 19 includes a clamping section 192 extending perpendicular to the bottom surface of the receiving cavity 12. The clamping section 192 is narrower than the remainder of the elastic pins 19 to be secured with the battery 20.

The battery 20 includes a bottom surface 22, an end surface 24, and a top surface 26. The corner of the bottom surface 22 has a recess 222 defined therein. The recess 222 has a plurality of parallel electrical strips 224 arranged therein. The electronic strips 224 are used to connect to the elastic pins 192. Accordingly, the battery 20 is electrically connected to the internal circuits of the housing 10. A protruding flange 226 extends above the recess 222. The protruding flange 226 is planar with the bottom surface 22 and defines a plurality of latching slots 2262 corresponding to elastic pins 19. Each latching slot 2262 aligns with an electrical strip 224. The latching slot 2262 has the same width as the clamping section 192 and latches with the clamping section 192. The end surface 24 has a latching hole 242 defined to receive the protrusion 182 of the housing 10. The top surface 26 defines a step groove 262 opposite to the end surface 24, thus, the battery 20 forms an engaging end 264 corresponding to the step groove 262. The engaging end 264 can be received in the locking groove 162.

To install the battery 20 in the receiving cavity 12 of the housing 10, the engaging end 264 is received into the locking groove 162 and presses against the stopping board 164. The stopping board 164 is pushed to abut against the inside of the locking groove 162 against the force of the elastic member 166. The other end of the battery 20 is assembled in the receiving cavity 12. The electronic strips 224 of the battery 20 resist the elastic pins 19, and the latching slots 2262 align above the clamping section 192 of the elastic pins 19. The battery 20 is then driven to slide toward the second end wall 18 by the return force of the elastic member 166. The clamping sections 192 engage in the latching slots 2262. Meanwhile, the protrusion 182 of the second end wall 18 is received in the latching hole 242 of the battery 20. Therefore, the battery 20 is latched in the receiving cavity 12.

In this latched position, due to the latching of the clamping section 192 with the latching slots 2262, the elastic pins 19 cannot depart from the electronic strips 224 of the battery 20, which maintain a continuous supply of power from the battery 20 to the internal circuit of the housing 10.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A battery for a portable electronic device, comprising:
   a recess, a sidewall of the recess forms a protruding flange;
   a plurality of electronic strips arranged on a bottom of the recess, the protruding flange extending above the electronic strips;

a plurality of latching slots defined in the protruding flange, each of the latching slots aligned with one of the electronic strips;
a bottom surface; and
an end surface;
wherein the recess is defined in the bottom surface of the battery; the protruding flange is a planar sheet, and is coplanar with the bottom surface and parallel to the bottom of the recess.

2. The battery as claimed in claim 1, wherein the latching slots are parallel to each other.

3. The battery as claimed in claim 1, wherein the end surface has a latching hole defined thereon to latch with a housing of an electronic device.

4. The battery as claimed in claim 1, wherein the battery forms an engaging end opposite to the end surface.

5. The battery as claimed in claim 1, further comprising a top surface; wherein the bottom surface and the top surface are parallel to each other and perpendicular to the end surface, and a portion of the bottom surface recesses towards the top surface to form the recess.

6. The battery as claimed in claim 5, wherein the recess is formed in a corner of the bottom surface, and opens at both the end surface and a side surface of the battery that is perpendicular to both the end surface and the bottom surface.

7. The battery as claimed in claim 6, wherein a portion of the top surface recesses towards the bottom surface, and thereby forms a step groove opposite to the end surface and an engaging end corresponding to the step groove.

\* \* \* \* \*